United States Patent [19]

Möldan et al.

[11] 4,236,588

[45] Dec. 2, 1980

[54] HAMMER DRILL WITH A LOCKABLE TOOL HOLDER

[75] Inventors: Karl Möldan, Munich; Wilm Krueger, Gröbenzell, both of Fed. Rep. of Germany

[73] Assignee: Hilti Aktiengesellschaft, Schaan, Liechtenstein

[21] Appl. No.: 913,542

[22] Filed: Jun. 8, 1978

[30] Foreign Application Priority Data

Jun. 27, 1977 [DE] Fed. Rep. of Germany ....... 2728961

[51] Int. Cl.[3] ....................... B23B 45/02; B23B 45/04; F16H 25/12

[52] U.S. Cl. .................................... 173/48; 74/22 A; 173/116

[58] Field of Search .................... 173/47, 48, 104, 116, 173/118; 74/22 A, 22 R

[56] References Cited

U.S. PATENT DOCUMENTS

| | | | |
|---|---|---|---|
| 2,270,929 | 1/1942 | Bugg | 74/22 R X |
| 2,531,849 | 11/1950 | Karleen | 74/22 A UX |
| 2,601,788 | 7/1952 | Parker | 74/22 A UX |
| 2,794,621 | 6/1957 | Beeson | 74/22 R X |
| 3,000,225 | 9/1961 | Taylor | 173/48 X |
| 3,119,274 | 1/1964 | Short | 74/22 R |
| 3,430,707 | 3/1969 | Rees | 173/48 |
| 3,521,497 | 7/1970 | Schmuck | 74/22 R |
| 3,847,229 | 11/1974 | Wanner et al. | 173/48 |
| 3,866,692 | 2/1975 | Stelljes | 173/48 |

FOREIGN PATENT DOCUMENTS 2316722 10/1973 Fed. Rep. of Germany ............ 173/48

*Primary Examiner*—Wm. Carter Reynolds
*Attorney, Agent, or Firm*—Toren, McGeady and Stanger

[57] ABSTRACT

In a hammer drill in which both rotationally and axially directed driving force components can be transmitted to a tool held in a tool holder, a coupling member is displaceable between three axially spaced positions. In the first position the coupling member transmits rotational driving force to the tool holder, in the second position the tool holder is freely rotatable and in the third position the coupling member locks the tool holder against rotation so that only axially directed driving force can be transmitted to the tool.

10 Claims, 3 Drawing Figures

HAMMER DRILL WITH A LOCKABLE TOOL HOLDER

SUMMARY OF THE INVENTION

The present invention is directed to a hammer drill in which the driving force is divided into a rotary component for rotating a tool and a striking component for applying percussive action in the axial direction of the tool. The rotary component of the driving force is supplied from a drive wheel to a coupling member and then to a tool holder. The coupling member is attached to the tool holder so that it rotates with it. The coupling member, however, is axially displaceable relative to the tool holder by means of an adjustment member so that it can be moved between three positions, one where it is coupled with the drive wheel, another where idle rotation of the tool holder can be effected and a third where the tool holder is locked relative to the housing of the hammer drill.

In hammer drills, particularly those operating at higher power, an increasing requirement is that, in addition to drilling, the device is also suitable for chiseling or chipping. Therefore, in hammer drills of such a type, one of the problems has been to provide a device in which the drill can be selectively arranged to impart rotary movement to a tool or to prevent such rotary movement. To afford problem-free handling and to provide a uniform design for the shank end of tools used in such drills, it is advantageous if the rotational driving force component can be stopped by means of a simple operating mechanism incorporated into the drill. More particularly, in such devices it is also required, when the rotational driving force is interrupted, that it be possible to lock the tool holder or the tool it secures in a desired rotational position, for example, when a flat chisel is used, for guiding the chisel as it is used.

In a known hammer drill, the rotational driving force is transmitted from a pinion driven by a motor to a bevel gear meshed with the pinion. In turn, the bevel gear is rotatably mounted about a hollow cylinder or sleeve which serves to guide the piston which provides the axially directed striking force component. In addition to the teeth which mesh with the driving pinion, the opposite face of the gear has interengagement means which can be engaged with similar means on a coupling member which, in turn, is secured to the sleeve for rotation therewith though it is axially movable along the sleeve. A compression spring mounted in the hammer drill housing maintains the coupling member in engagement with the bevel gear. Further, an adjustment member is connected to a shoulder of the coupling member. By pivoting the adjustment member, the coupling member can be disengaged from the bevel gear against the force of the spring. The coupling member includes a hexagonally shaped jacket with one of the six surfaces of the jacket being in surface contact with a surface of the eccentric handle in the disengaged position of the coupling member. Accordingly, the coupling member is secured against rotation as are the cylinder or sleeve and the tool holder mounted on the front end of the sleeve for rotation with it. In this position, during further operation of the hammer drill, only percussion force is directed to the tool in the tool holder. This type of locking action against rotation has several significant disadvantages, as an example, the hexagonal shape of the coupling member offers only six possible locking positions. Such an arrangement is unsatisfactory in respect to handling of the device. Due to the high loads acting on the locking surfaces of the coupling member and eccentric handle, however, a design of the coupling member with more sides is unacceptable. Moreover, the hexagonal shape has the disadvantage that relatively frequently the face of the eccentric handle contacts an edge of the hexagonal surface rather than a face and, therefore, the locking action can be attained only after a prior turning of the tool holder relative to the tool. Another negative feature of this arrangement is that the eccentric handle only forms the disengagement of the coupling member, while its coupling action is effected by the compression spring. Apart from the disadvantage stemming from the plurality of parts involved, the mounting of a compression spring also requires a significant structural length of the device.

Therefore, a primary object of the present invention is to provide a hammer drill which permits locking of the tool holder during a chiseling or percussion action and such arrangement is distinguished by its simple construction and its ability to absorb high forces.

In accordance with the present invention, the coupling member is provided with interengagement surfaces on its transverse face directed away from the driving wheel and these interengagement surfaces can be displaced into locking engagement with similar surfaces formed in the housing.

Due to this arrangement, by providing interengaging projections and recesses on the coupling member and the housing a corresponding number of rotational or locking positions can be provided. The interengagement of the projections and recesses affords, in addition, a form-positive connection between the coupling member and housing capable of absorbing high forces, since the forces are distributed over all of the projections and recesses. Further, the "finding" of the individual locking positions poses no problems, especially since the projections and recesses can easily find one another, due, for example, to the rounded shape of the projections and recesses.

Another advantage of this arrangement is that the coupling member can be axially displaced between the driving or locked positions by means of the adjustment member which may be a slide member without any requirement for a compression spring which would have an undesirable effect on the structural length of the drill.

Preferably, the coupling member is in the form of a hollow cylinder or sleeve. Such a part can be produced in an extremely simple manner. On one hand, to provide a locking action against rotation, and, on the other hand, to provide axial displacement relative to the tool holder, the connection between the coupling member and the tool holder is advantageously provided by an adjusting spring which is a known machine element.

The projections and recesses formed in the coupling member and the housing can be constructed in a simple and known manner as clutch or claw gear ribs. The "finding" of each locking position is facilitated if the sides of the gear rims are beveled to taper upwardly.

The clutch gear rim of the housing can be formed directly in the housing or, for example, it can be constructed as a locking ring rigidly connected to the housing so that it does not rotate.

This form-positive interconnection of the coupling member and the housing permits the transmission of great forces, it affords another embodiment for reciprocal interengagement of the coupling member and the drive wheel by providing an additional clutch gear rim on each for transmitting the rotary driving force.

Preferably, the coupling member has an annular groove in its outer surface serving to receive an eccentric cam on the adjustment member. The eccentric cam is arranged on the adjustment member so that the coupling member meshes with the driving wheel or engages the clutch gear rim on the housing when the adjustment member is rotated through 90° in one direction or the other from the position permitting idle rotation. For actuating the adjustment member it can be provided with a pivotable lever located on the exterior of the housing. Advantageously, the different positions of the adjustment member can be marked on the housing.

An extremely simple structural arrangement of a hammer drill embodying the present invention is provided where the coupling member laterally encloses a drive sleeve connected to the tool holder. The drive sleeve may enclose an inner cylinder serving as a guide for the pistons imparting the axial driving action or the sleeve itself may provide the guiding bore for the pistons. It is possible to form the tool holder and the drive sleeve as a single member or to afford a functionally one-part structure by means of a threaded connection. In such arrangements, the drive sleeve transmits the rotational driving force to the tool holder and thence to a tool inserted in the holder with the rotational movement being transmitted via the coupling member and its adjusting spring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
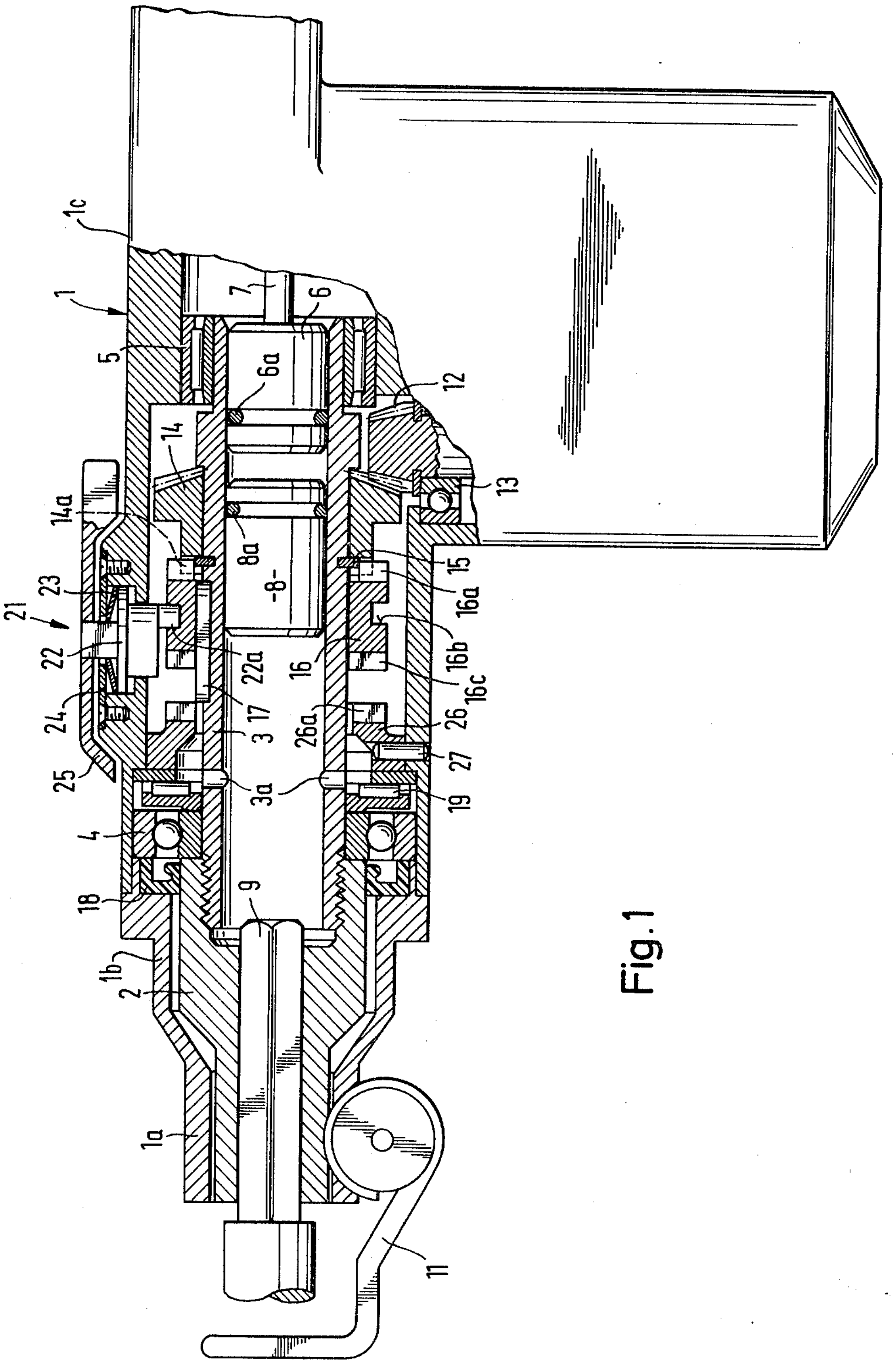
FIG. 1 is a side view, partly in section, of a hammer drill, embodying the present invention, in position to effect a drilling operation.
Figure 2:
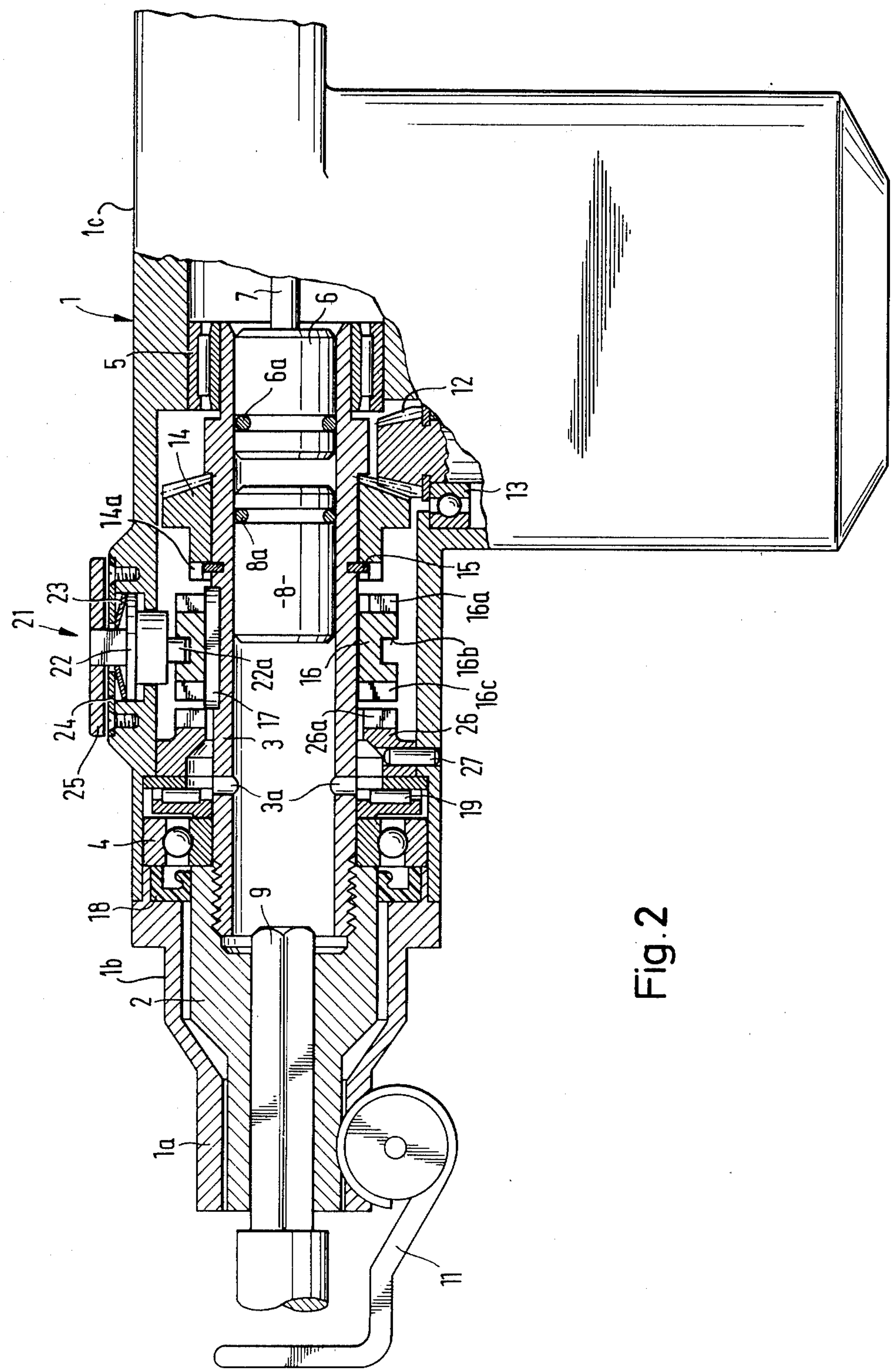
FIG. 2 is a view similar to FIG. 1, with the hammer drill positioned for idle rotation.
Figure 3:
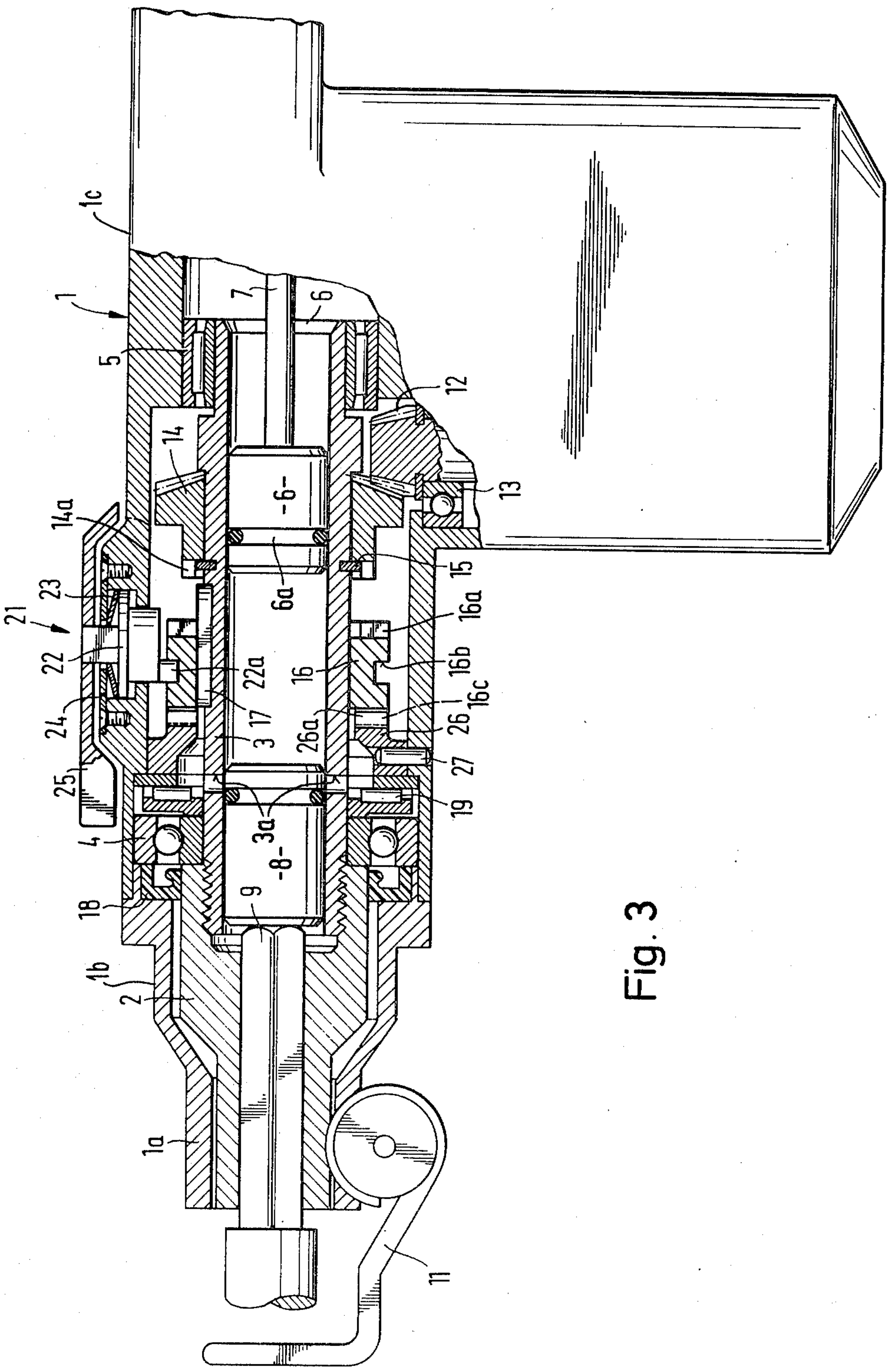
FIG. 3 is a view similar to FIGS. 1 and 2 with the hammer drill locked against rotational movement so that only striking or percussive forces are transmitted by the hammer drill.

In the drawings, a hammer drill is shown having a housing 1. The housing has a conventional shape with a drilling tool inserted in its front end 1*b* and driving means being located at its opposite rear end 1*c*. An attachment 1*a* is secured to and extends forwardly from the front end 1*b* of the housing 1. Within the attachment 1*a* is a tool holder 2 in threaded engagement with a drive sleeve 3 which extends from the tool holder toward the rear end 1*c* of the housing. The tool holder 2 has a bore for receiving a drilling tool and the sleeve forms another bore in axial alignment with the one in the tool holder. The drive sleeve is rotatably supported adjacent its forward end by a ball bearing 4 and at its rear end by a roller bearing 5. A driven piston 6 is slidably displaceable through the bore in the drive sleeve 3. The driven piston is reciprocated through the bore in the drive sleeve by means of a piston rod 7 which is only partially illustrated. The driven piston 6 has an elastic sealing arrangement 6*a* encircling its outer surface and in contact with the inner surface of the bore in the drive sleeve 3. Within the drive sleeve 3 and forwardly of the driven piston 6 is a driving piston 8. Similarly, the driving piston is reciprocally movable through the bore in the drive sleeve and has a sealing ring 8*a* around its outer surface in sliding contact with the inner surface of the bore in the drive sleeve. As shown in FIGS. 1, 2 and 3, an air cushion is located between the forward end of the driven piston 6 and the rearward end of the driving piston 8 within the bore in the drive sleeve. When the driven piston 6 executes a stroke, the driving piston 8 moves back and forth in the same manner due to the this air cushion. The free movement of the driving piston 8 is ensured by bores 3*a* through the drive sleeve which ensures that air present in front of the drive piston can flow out of the bore as the drive piston moves forwardly and, in addition, permits outside air to flow into the bore ahead of the driving piston as it moves rearwardly through the bore. Due to the reciprocating action imparted to the driving piston 8, it strikes against the rearward end of the shank 9 of a tool inserted into the tool holder 2. The shank has a hexagonal cross section corresponding to that of the tool holder 2 to provide rotational movement to the tool via the tool holder. A spring clip 11 mounted on the forward end of the attachment 1*a* prevents the tool inserted into the tool holder 2 from falling out.

The rotational drive imparted to the tool is initiated by a pinion 12 driven by a motor, not shown. Pinion 12 is supported in the housing by means of a ball bearing 13. As shown in the drawings, the pinion meshes with a bevel gear 14 acting as a drive wheel. The drive wheel or bevel gear 14 laterally encloses and is freely rotatable relative to the drive sleeve 3, with a locking washer 15 preventing any axial movement of the drive wheel relative to the sleeve. The transverse end face of the bevel gear 14, facing toward the front end 1*b* of the housing, has a clutch gear rim or third interengagement means 14*a* including alternating projections and recesses which engages with a first interengagement means or similar clutch gear rim 16*a* on the first end face of a coupling member 16. The first end face of the coupling member faces toward the drive wheel 14 and extends transversely of the axial direction of the tool holder. The coupling member 16 is ring or sleeve shaped, in the form of a hollow cylinder, and extends around and in sliding contact with the outer surface of the drive sleeve. While the coupling member is slidable in the axial direction relative to the drive sleeve 3, it is connected by means of an adjusting spring 17, to the drive sleeve so that the two parts rotate together as a unit. As a result, the shank 9 of the tool is rotated by the pinion 12 through the drive wheel or bevel gear 14, the coupling member 16, the adjusting spring 17, the drive sleeve 3 and, finally, the tool holder 2. With the coupling member in this position of engagement with gear rim 14*a* the driving piston 8 is capable of reciprocation to impart percussive forces to the end of the tool shank 9. To assure proper sealing, an elastic sleeve-like sealing member 18 is positioned between the attachment 1*a* and the tool holder 2. Moreover, the tool holder 2 is supported on the housing 1 by means of another roller bearing 19 which absorbs the axial forces.

The coupling member 16 is held in meshed engagement with the bevel gear 14 by an adjustment member 21. The adjustment member 21 includes a rotatable bolt 22 rotatably mounted in the housing. Further, the bolt is supported for a limited amount of axial movement in the housing. Positioned on the bolt 22 is an eccentric cam 22*a* disposed in engagement with an annular groove 16*b* on the outer surface of the coupling member 16. Along with its eccentric cam 22*a*, the bolt 22 is biased into the annular groove 16*b* by a cup spring 23. In turn, the cup spring rests against a disk 24 secured to the housing. Rigidly connected to the bolt 22 is a swing lever 25 which permits rotation of the bolt. As a result, by pivoting the swing lever 25, the coupling member can be displaced in the axial direction along the drive sleeve 3. In FIG. 2, the lever 25 has been pivoted through 90°, as compared to FIG. 1, with the bolt 22 effecting a similar rotation. Accordingly, as the bolt 22 rotates, due to the interengagement of its eccentric cam 22*a* with the groove 16*b* in the coupling member, the coupling member is displaced axially forwardly toward the tool holder causing the clutch gear rims 14*a* and 16*a* to disengage so that the transmission of rotational movement from the bevel gear 14 to the drive sleeve or cylinder 3 and subsequently to the shank 9 is interrupted. In this intermediate position of the coupling member, the tool holder 2 and the drive sleeve 3 can be freely rotated relative to the housing 1, in other words, the coupling member is in its idle rotation position. If the hammer drill is operated with the coupling member in this position, only the percussion forces are directed against the end of the tool shank 9.

At its transverse front end or second end face, that is, its transverse face directed toward the front end 1*b* of the housing 1, the coupling member 16 has another clutch gear rim or second interengagement means 16*c* which can be interengaged with a corresponding clutch gear rim or fourth interengagement means 26*a* on a locking arrangement 26. The locking ring is fixed to the housing 1 via pins 27. In FIG. 3, the locked position of the coupling member 16 is illustrated and this position is reached by rotating or pivoting the adjustment member 21 so that the clutch gear rim 16*c* on the coupling member intermeshes with the clutch gear rim 26*a* on the locking ring. In this position, the hammer drill cannot transmit any rotary movement from the drive wheel or bevel gear 14 to the tool shank 9 in the tool holder. On the contrary, the rotatability of the tool is prevented by the form-positive interengagement of the coupling member 16 and the locking ring 26. Accordingly, if a tool, such as a flat chisel, is positioned in the hammer drill then only a percussion action is imparted to the tool. The locked position of the tool in the hammer drill can be selected, first, by inserting a chisel tool into the tool holder which is in position for idle rotation, as shown in FIG. 2, so that the chisel tool can be rotated into the desired position, and, subsequently, by means of the adjustment member 21, moving the coupling member into the locked positions as shown in FIG. 3.

While specific embodiments of the invention have been shown and described in detail to illustrate the application of the inventive principles, it will be understood that the invention may be embodied otherwise without departing from such principles.

What is claimed is:

1. Hammer drill comprising a housing having a front end and a rear end, tool holder means located within said housing and having an axis of rotation extending in the direction of the rear end to the front end of said housing, said tool holder means having a front end facing in the same direction as the front end of said housing and a rear end spaced axially from the front end of said tool holder means and located closer to the rear end of said housing, said tool holder means arranged to receive the shank end of a tool, first means disposed in said housing for rotating said tool holder means, second means disposed in said housing for applying percussion force to said tool mounted in said tool holder means, said first means includes a drive wheel positioned in said housing for rotation about the axis of rotation of said tool holder means, a coupling member located within said housing and encircling the axis of rotation of said tool holder means, said coupling member secured to said tool holder means for rotation therewith and said coupling member being axially displaceable along the axis of rotation of said tool holder means, an adjustment member mounted on said housing and connected to said coupling member for axially displacing said coupling member between a first position in engagement with said first means for rotating said tool holder means, a second position axially displaced from engagement with said first means for affording idle rotation of said tool holder means and a third position spaced axially from the first and second positions with said coupling member in locked engagement with said housing so that only said second means is effective for imparting percussion force to a tool received in said tool holder means wherein the improvement comprises that said second means is separate from said first means and is capable of imparting percussion force in each of the first and third positions of said coupling member, said coupling member has a first end face and a second end face in axially spaced relation to said first end face and each extending transversely of the axial direction of said tool holder means, first interengagement means on said first end face and a second interengagement means on said second end face of said coupling member, said drive wheel having third interengagement means for engagement with said first interengagement means, said housing at a position spaced in the direction of the axis of rotation of said tool holder means from said drive wheel having fourth interengagement means thereon for engagement with said second interengagement means on said coupling member, and said coupling member being axially displaceable between said drive wheel and said fourth interengagement means on said housing so that in the first position said first and third interengagement means are engaged and in the third position said second and fourth interengagement means are engaged.

2. Hammer drill, as set forth in claim 1, wherein said coupling member is shaped as a hollow cylinder.

3. Hammer drill, as set forth in claim 2, wherein said second interengagement means and said fourth interengagement means each comprises a clutch gear rim.

4. Hammer drill, as set forth in claim 2, wherein said first interengagement means and said third interengagement means each comprise a clutch gear rim.

5. Hammer drill, as set forth in claim 2, wherein said coupling member has an annular groove in the radially outer surface thereof, and said adjustment member includes an eccentric cam positioned within said annular groove so that by pivotally displacing said adjustment member said cam moves said coupling member in the direction of the axis of rotation of said tool holder means.

6. Hammer drill, as set forth in claim 5, wherein said tool holder means includes a drive sleeve concentric with the axis of said axis of rotation of said tool holder means and said coupling member extending around and in sliding contact with the outer surface of said drive sleeve.

7. Hammer drill, as set forth in claim 6, wherein said tool holder means includes a tool holder coaxial with and secured to said drive sleeve at the end thereof closer to the front end of said housing for rotation with said drive sleeve.

8. Hammer drill, as set forth in claim 7, wherein said drive wheel is coaxial with and rotatably mounted on the outer surface of said drive sleeve.

9. Hammer drill, as set forth in claim 8, wherein said drive sleeve forms an axially extending bore, said tool holder having a bore therethrough in axial alignment with an opening to the bore in said drive sleeve, said second means comprises a driving piston axially displaceably mounted within the bore in said drive sleeve, and a driven piston mounted within the bore in said drive sleeve on the opposite side of said driving piston from said tool holder, said driving piston and driven piston disposed in axially spaced relation forming an air cushion therebetween.

10. Hammer drill, as set forth in claim 1, wherein said adjustment member includes an adjustment lever pivotally mounted on the outer surface of said housing, a bolt rigidly connected to said lever and extending therefrom into said housing, said eccentric cam attached to said bolt, and spring means in contact with said housing for biasing said bolt radially inwardly.

* * * * *